(12) United States Patent
Kato et al.

(10) Patent No.: US 7,242,381 B2
(45) Date of Patent: Jul. 10, 2007

(54) DISPLAY PANEL

(75) Inventors: Takahira Kato, Kariya (JP); Satoru Tamura, Anjo (JP); Ryo Suzuki, Kariya (JP); Hiroyuki Nagino, Nishio (JP)

(73) Assignee: DENSO Corporation, Kariya (JP)

( * ) Notice: Subject to any disclaimer, the term of this patent is extended or adjusted under 35 U.S.C. 154(b) by 597 days.

(21) Appl. No.: 10/867,180

(22) Filed: Jun. 15, 2004

(65) Prior Publication Data

US 2005/0007301 A1    Jan. 13, 2005

(30) Foreign Application Priority Data

Jun. 16, 2003 (JP) .............................. 2003-170868
Apr. 19, 2004 (JP) .............................. 2004-122829

(51) Int. Cl.
*G09G 3/36* (2006.01)
(52) U.S. Cl. .................. 345/89; 345/589; 345/690; 358/3.06
(58) Field of Classification Search ............... 345/77, 345/82, 83–84, 87–90, 4, 214, 589, 593, 345/594–598, 600, 601; 358/3.06–3.1, 3.2, 358/536; 382/162–167, 181
See application file for complete search history.

(56) References Cited

U.S. PATENT DOCUMENTS

| | | | |
|---|---|---|---|
| 5,946,453 A * | 8/1999 | Broddin et al. ............... | 358/1.9 |
| 6,452,653 B1 * | 9/2002 | Yamanaka et al. .......... | 349/113 |
| 6,542,141 B1 * | 4/2003 | Mano et al. .................. | 345/89 |
| 6,753,877 B2 * | 6/2004 | Iwasaki ...................... | 345/589 |
| 6,989,913 B2 * | 1/2006 | Asai ........................... | 358/1.9 |
| 7,092,128 B2 * | 8/2006 | Wang et al. ............... | 358/3.06 |
| 2002/0140657 A1* | 10/2002 | Iwasaki ....................... | 345/89 |

FOREIGN PATENT DOCUMENTS

JP    Y-2526323    11/1996

* cited by examiner

*Primary Examiner*—Richard Hjerpe
*Assistant Examiner*—Mansour M. Said
(74) *Attorney, Agent, or Firm*—Posz Law Group, PLC

(57) ABSTRACT

A display panel includes a first halftone dot layer and a second halftone dot layer. The first and the second layers are formed with halftone dots printed at regular intervals in gradation patterns so that brightness gradually changes. The first and the second layers are arranged in parallel to each other yet rotated relative to each other by a predetermined angle measured between directions in which the halftone dots are aligned in the first and the second layers.

11 Claims, 8 Drawing Sheets

DISPLAY PANEL

CROSS REFERENCE TO RELATED APPLICATION

This application is based on and incorporates herein by reference Japanese Patent Applications No. 2003-170868 filed on Jun. 16, 2003 and No. 2004-122829 filed on Apr. 19, 2004.

FIELD OF THE INVENTION

The present invention relates to a display panel included in a display device.

BACKGROUND OF THE INVENTION

A vehicular display device having a display panel is proposed in JP-Y-2526323. Halftone dots are printed on the display panel to produce a gradation so that the brightness gradually changes. In general, definition in screen printing is lower than in offset printing; namely, the screen printing has limitations on reducing intervals between adjacent dots. Because of the limitation, shapes of the dots are clearly recognized by a person with resolution of human vision when the halftone dots are only provided in a single layer. Therefore, a smooth gradation cannot be produced by halftone dots arranged in a single layer.

SUMMARY OF THE INVENTION

The present invention therefore has an objective to provide a display panel including halftone dots printed in a gradation pattern by screen printing with high gradation display resolution. A display panel of the present invention includes a substrate, a first halftone dot layer, and a second halftone dot layer. The first and the second halftone dot layers are formed with halftone dots printed in gradation patterns. They are arranged in parallel to each other yet rotated relative to each other by a predetermined angle. The predetermined angle is measured between directions in which the halftone dots are aligned in the first and the second halftone dot layers. The directions are referred to as alignment directions.

The display panel includes at least two layers that are formed with halftone dots printed in gradation patterns. These layers look as if they are on the same plane to a person, namely, dots looks as if they arranged at smaller intervals than the smallest intervals in the screen printing. Thus, the gradation produced by these layers improves in comparison with the gradation produced by a single layer.

When the first and the second halftone dot layers are simply arranged in parallel to each other, fringes or moire fringes may be produced. By rotating the first and the second halftone dot layers relative to each other by the predetermined angle, the fringes are reduced.

The fringes look brighter as the overlapping area of the dots increases and darker as the area decreases. When the alignment directions are parallel to each other, that is, the alignment direction is 0°, the dots equally overlaps in the direction perpendicular to the direction of gradation in theory. The overlapping area becomes larger as the size of the dot increases. Thus, the smooth gradation is maintained.

However, the angle hardly becomes 0° and a slight angle $\theta 1$ is measured. The overlapping area varies at certain intervals. As a result, a dark area repeatedly appears at a regular interval L as shown in FIG. 12. A series of the dark areas is recognized by the person as a fringe. The first and the second halftone dot layers shown in FIG. 11 are also rotated relative to each other by a very slight angle. The interval L in FIG. 11 is very large in comparison with the interval L shown in FIG. 12. Thus, the fringe is hardly recognized. In FIG. 12, the first and the second halftone dot layers are rotated by a larger angle $\theta 1$, which is about 1°, to display the fringe.

Referring to FIG. 13, the interval L becomes shorter as the angle becomes larger. When the angle is larger than a predetermined angle, the dark area does not repeatedly appear and the fringe is not recognized as shown in FIG. 14. The same results are obtained when shapes or intervals of dots are different from the first layer to the second layer as long as the dots are arranged at regular intervals. Namely, no matter what shapes or intervals, the fringe is recognized when the layers are not rotated and the fringe is not recognized when the layers are rotated by the angle $\theta$. A smooth gradation is produced without the fringe by rotating the two layers relative to each other by the angle $\theta$.

BRIEF DESCRIPTION OF THE DRAWINGS

The above and other objectives, features and advantages of the present invention will become more apparent from the following detailed description made with reference to the accompanying drawings. In the drawings.

DETAILED DESCRIPTION OF THE PREFERRED EMBODIMENT

Figure 1:
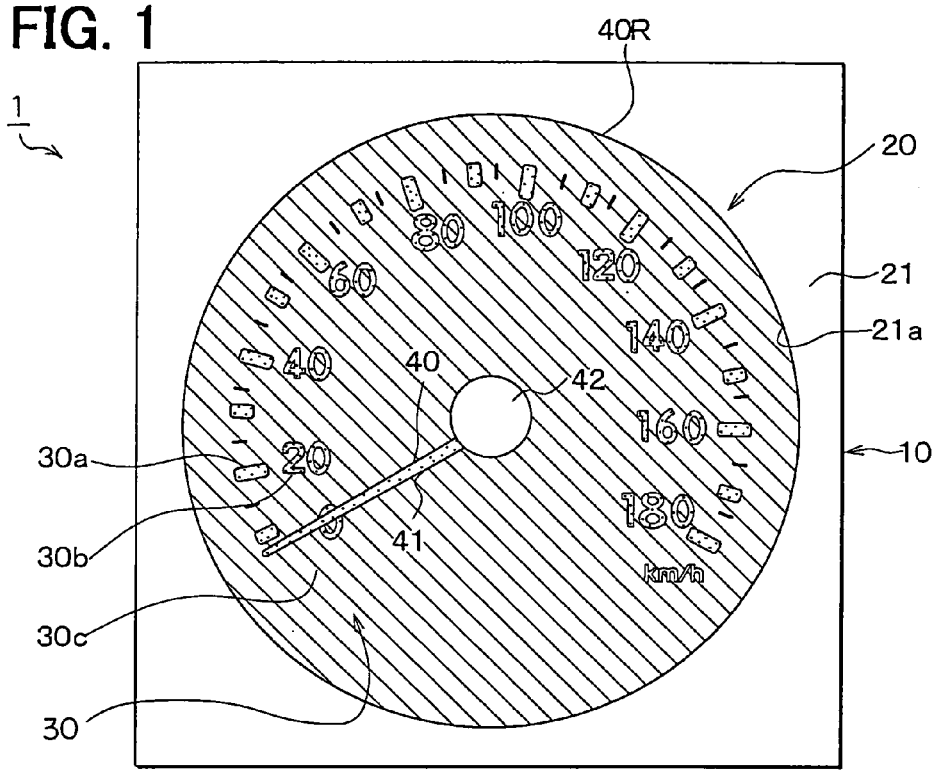
FIG. 1 is a front view of a speedometer including a display panel according to the first embodiment of the present invention.

The preferred embodiments of the present invention will be explained with reference to the accompanying drawings. In the drawings, the same numerals are used for the same components and devices.

First Embodiment

Figure 2:
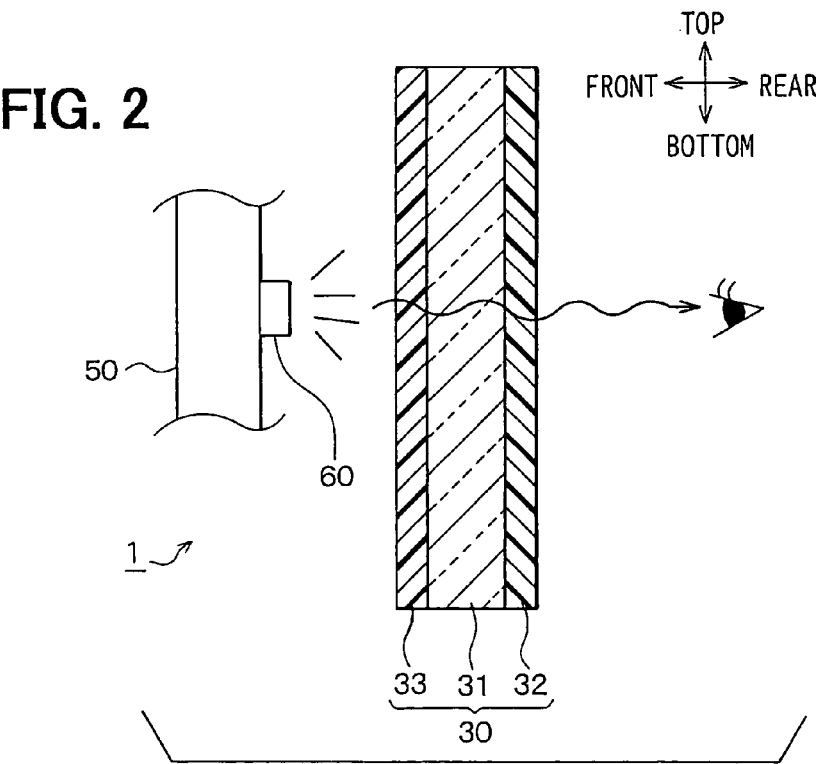
FIG. 2 is a cross-sectional view of the display panel according to the first embodiment.

Referring to FIGS. 1 and 2, a speedometer 1 is installed in an instrument panel (not shown) of a vehicle in a position to face a driver. Arrows in FIG. 2 indicate front, rear, top and bottom of the vehicle. The speedometer 1 includes a display panel 30, a needle 40, a printed circuit board (PCB) 50, a light source 60, and a movement (not shown), all housed in a casing 10 and a hood 20. The needle 40, the casing 10, and the hood 20 are not shown in FIG. 2 for an explanatory purpose.

The hood 20 has a bottom portion 21 and a ring portion. A flat plate is rolled up into a ring to fence around a display area of the display panel 30 with a circular outline 40R. The ring portion extends from the bottom portion 21 along a line of vision of a driver, that is, the front-to-rear direction of the vehicle indicated with the arrow. The bottom portion 21 is fixed to the casing 10. The casing 10 and the hood 20 are made of a light blocking synthetic resin.

The display panel 30 includes marks 30a, numbers 30b, and a background display 30c. The marks 30a and the numbers 30b are arranged on the background display 30c. The display panel 30 is fitted into an opening 21a in the bottom plate portion 21 from the back of the facing plate 20, and backlighted by the light source 60. The light source 60 is arranged adjacent to a rear surface of the display panel 30.

The display panel 30 is constructed of a translucent substrate 31, a first halftone dot layer 32, and a second halftone dot layer 33. The first and the second layers 32, 33 are formed by printing on opposite surfaces of the substrate 31, respectively. The background display 30c is represented by the first and the second layers 32, 33. A shaded area in FIG. 1 is recognized by the driver as the background surface 30c.

The marks 30a and the numbers 30b are provided on the substrate 31 by white or red translucent printing in areas that the first and the second layers are not formed. The printing of the marks 30a, the numbers 30b, and the background display 30c is performed by known screen printing. The printing of the background display 30c, which is an important part of the present invention, will be discussed in detail later.

The needle 40 is constructed of a pointer 41 and a boss 42. The pointer 41 rotates along a front surface of the display panel 30 and points the marks 30a, and the boss 42 holds the pointer 41. A rotating shaft (not shown) of the movement is press-fitted in the boss 42. A drive power of the movement is transmitted to the boss 42 via the rotating shaft to rotate the needle 40.

The PCB 50 is installed adjacent to the rear surface of the display panel 30. The movement, the light source 60, a microcomputer (not shown) and other electronic components (now shown) are mounted on the PCB 50. Driving of the movement or the light source 60 is controlled by the electronic components.

The light source 60 is mounted on a front surface of the PCB 50. It is arranged such that light emitted from it travels through the display panel 30 from the rear surface to the front surface of the display panel 30. A light emitting diode is used for the light source 60. Multiple light sources may be used for producing even brightness. Alternatively, a light guide for guiding light from the light source 60 to the display panel 30 may be arranged between the light source 60 and the display panel 30. The light guide has a grained reflecting surface for emitting light from its entire surface toward the display panel 30. Therefore, the display panel 30 is evenly lighted.

The first and the second layers 32, 33 are formed with halftone dots P screen printed on the substrate 31 in patterns of gradation from a "light" end to a "dark" end. The light end permits more light to pass through while the dark end permits less light to pass through. Namely, brightness at the light end is higher than the dark end. The halftone dots P are arranged so that the brightness gradually changes between the light end and the dark end. The brightness can be varied by changing intervals between adjacent halftone dots or the size of the dots while maintaining the intervals consistent. In the display panel 30, different sizes of the halftone dots P are arranged in the first and the second layers 32, 33 at regular intervals as shown in FIGS. 3A to 3E.

Figure 3A:
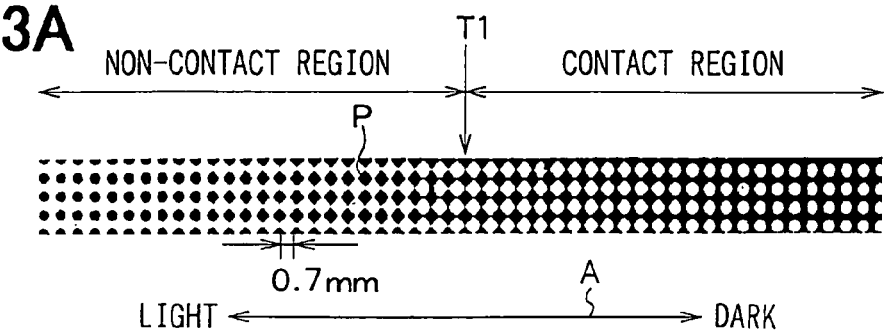
FIG. 3A is a gradation pattern printed on the display panel according to the first embodiment.
Figure 3B:
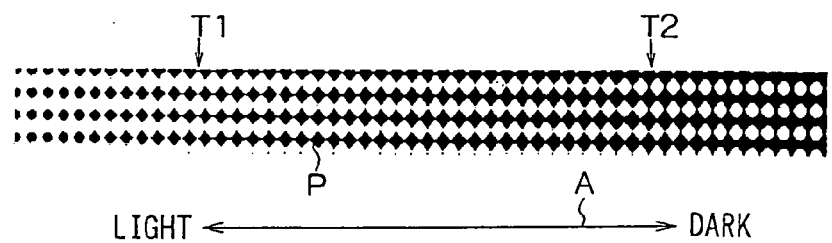
FIG. 3B is an example of gradation pattern interchangeable with the pattern shown in FIG. 3A.
Figure 3C:
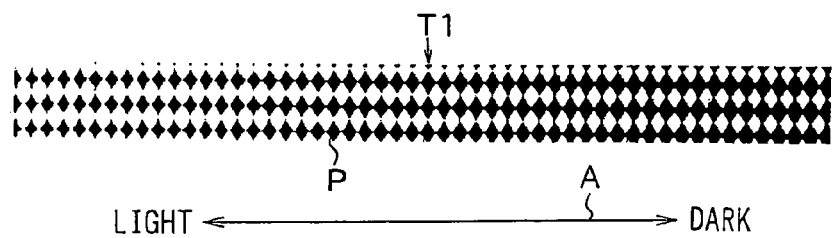
FIG. 3C is an example of gradation pattern interchangeable with the pattern shown in FIG. 3A.
Figure 3D:
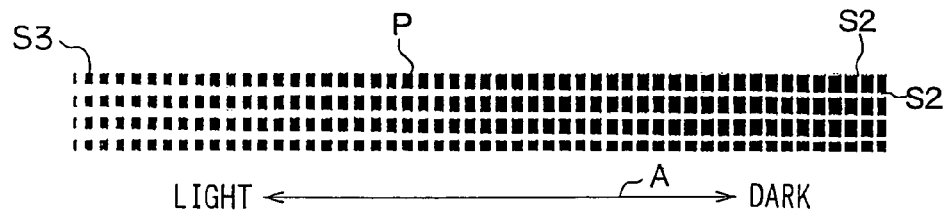
FIG. 3D is an example of gradation pattern according to the first embodiment.
Figure 3E:
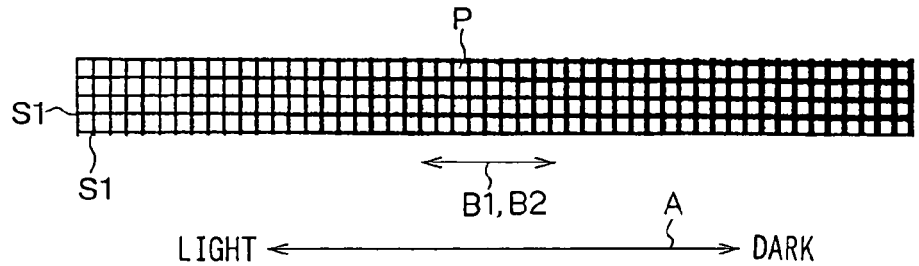
FIG. 3E is an example of gradation pattern according to the first embodiment.

Commonly used shapes of the dots P are a round shown in FIGS. 3A, 3B, a diamond shown in FIG. 3C, a square shown in FIG. 3D, and a cross shown in FIG. 3E. The cross is also referred to as an inverted square. The intervals of the dots P are set so that 300 dots are included in an inch square, which makes an interval between the adjacent dots P about 0.7 mm. The interval of 0.7 mm is the limit of the screen printing and therefore reducing the interval under 0.7 mm is normally difficult. The brightness gradually decreases from left to right as the size of the dots P gradually increases from left to right. A direction, in which the brightness changes, is referred to as a gradation direction A and indicated with a double-pointed arrow.

The first and the second layers 32 and 33 are arranged such that the first layer 32 overlies the second layer 33 to create a double layer. The double layer produces a gradation on the background display 30c. The background display 30c is formed so that the gradation direction A is parallel to a radius of the rotation of the needle 40. The double layer produces the gradation from the light end adjacent to the center of rotation of the needle 40 to the dark end adjacent to the outside diameter of the rotation.

The dots P are arranged in a grid pattern so that they are horizontally or vertically aligned on the background display 30 as shown in FIGS. 3A-3E. A direction in which the dots P are aligned (the left-to-right direction of FIGS. 3A-3E) in the first layer 32 is referred to as a first alignment direction B1. Likewise, a direction in which the dots P are aligned in the second layer 33 is referred to as a second alignment direction B2. The alignment directions B1, B2 are parallel to the gradation direction A. In a practical application, they may not be parallel to each other since the gradation direction A is decided to become parallel to the radius of the rotation of the needle 40.

Figure 4:
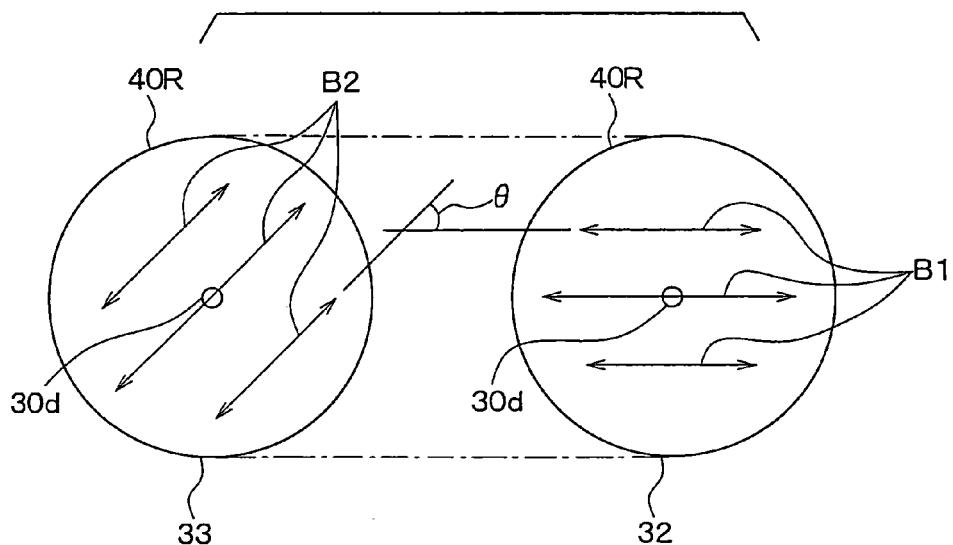
FIG. 4 is top views of first and second halftone dot layers showing a positional relationship between the layers according to the first embodiment.

The first layer 32 is placed over the second layer 33 with a predetermined rotation angle θ measured between the first and the second alignment directions B1, B2 as shown in FIG. 4. The angle θ is predetermined around 30 degrees. The angle formed at the intersection of the first and the second alignment directions B1, B2, or the rotation angle θ, is preferably set between 10 and 40 degrees inclusive. A through hole 30d is provided for the rotor shaft of the movement to pass through at a center of the display panel 30.

A rate of the gross area covered by the dots P in the first and the second layers 32, 33 per a unit area is referred to as a dot coverage rate and expressed in percentage. The rate is 0% when no dots P are provided and 100% when the entire area is filled with the dots P. In areas of the display panel 30 having the light transmittance of 100%, the dot coverage rate of the first and the second layers 32, 33 is 0%. In areas of the display panel 30 having the light transmittance of 0%, the rate is 100%, where the dots P are black.

Referring to FIGS. 3A to 3C, each of the first and the second layers 32, 33 has a contact region S1 and a non-contact region S2. In the contact region S1, adjacent dots are connected. In the non-contact region S2, adjacent dots are apart from each other. A boundary between the contact region S1 and the non-contact region S2 is referred to as a tone jump boundary T1. The boundary T1 exists where the dot coverage rate becomes 50% when the first and the second layers 32, 33 are formed with standard round dots P as shown in FIG. 3A.

A vertical tone jump boundary T2 may exist as shown in FIG. 3B. On one side of the boundary T2, the dots P are vertically connected. In FIG. 3B, the vertical boundary T2 exists where the dot coverage rate becomes 60% while the horizontal boundary T1 exists where the dot coverage rage becomes 40%.

In general, the brightness seems to largely vary around the boundary T1. If the first and the second layers 32, 33 are arranged such that the boundaries T1 are located at the same position, the brightness sharply varies where the two boundaries T1 matches. As a result, a smooth gradation cannot be produced. By rotating the first and the second layers 32, 33 relative to each other by the angle θ, the sharp variation in the brightness can be reduced. Thus, a smooth gradation can be produced.

The non-contact region S2 does not exist when the dots P are formed in a square or in a cross as shown in FIGS. 3D, 3E. In these cases, the gradations are produced by only the non-contact region S2. The sharp variation in the brightness can be reduced with this configuration since the boundary T1 does not exit. However, the cross dots may cause the following problem.

The black areas indicated with S1 are formed in lines and a gradation is produced by changing the thickness of the lines. The thickness of the lines is small at the light end and therefore variations in the black areas, or lines, S1 are hardly recognized by the driver. As a result, the gradation cannot be produced at the light end. Likewise, the white area indicated S2 in FIG. 3D are formed in fine lines at the dark end, and variations in the white areas, or lines, are hardly recognized by the driver. Therefore, the gradation cannot be produced at the dark end.

Furthermore, the black lines S1, S3 at the light end are too fine to be printed by screen printing, that is, they cannot be properly printed. Thus, a desired gradation cannot be produced. Although the gradation patterns shown in FIGS. 3A to 3C has problems with the sharp variation in the brightness, a desired gradation can be produced at the light and the dark ends. The problems can be resolved by arranging the first and the second layers 32, 33 so that the boundaries T1 are located at different positions. An example of the round dots shown in FIG. 3A will be discussed in detail. However, other types of dots shown in FIGS. 3B, 3C are interchangeable with the round dots.

The first and the second layers 32, 33 include standard round dots. In FIG. 3A, the brightness seems to sharply change at the boundary T1. The color of the dots P is black and therefore the rate is 100% in areas having the light transmittance of 0%.

Figure 5:
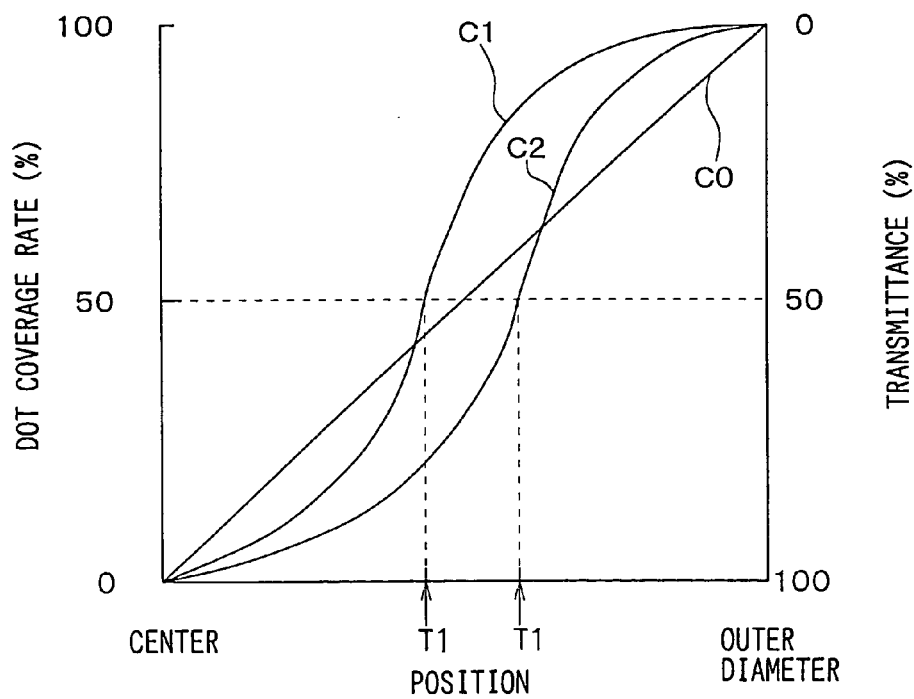
FIG. 5 is a graph showing relationships between a distance from the center of the display panel, a dot coverage rate, and light transmittance.

The dot coverage rate and the light transmittance vary as a curve C1 shown in FIG. 5 in the first layer 32. Likewise, the rate and the light transmittance vary as a curve C2 in the second layer 32. The dot coverage rate and the light transmittance vary according to a position between the center and the outside diameter of the background display 30c. The first and the second layers 32, 33 are arranged so that the boundaries T1 lie at different positions between the center and the outer diameter.

When the printing layers 32, 33 are formed so that the dot coverage rate and the light transmittance linearly vary as a line C0, variations in the brightness are not recognizable. This is because an ability of the human vision to recognize variations in brightness is not very high in regions having the light transmittance about 0% and about 100%. Therefore, different sizes of the dots P are provided to vary the dot coverage rate and the light transmittance as the curves C1 and C2. The gradation is produced by changing the sizes of the dots P. The dots P are arranged so that variations in the dot coverage rate are small in regions having the light transmittance about 0% and about 100%. Such regions have the dot coverage rate about 0% and about 50%, respectively.

When the light source 60 is turned on through driving control performed by the microcomputer, the display panel 30 is backlighted. A black color gradation is produced on the background surface 30c. The marks 30a and the numbers 30b are lighted in white or red with even brightness.

Since the first and the second layers 32, 33 are arranged in parallel to each other, they look as if they are on the same plane to the driver. Namely, intervals of the dots P look smaller than the smallest interval in the screen printing. As a result, resolution in displaying the gradation is improved.

Figure 12:
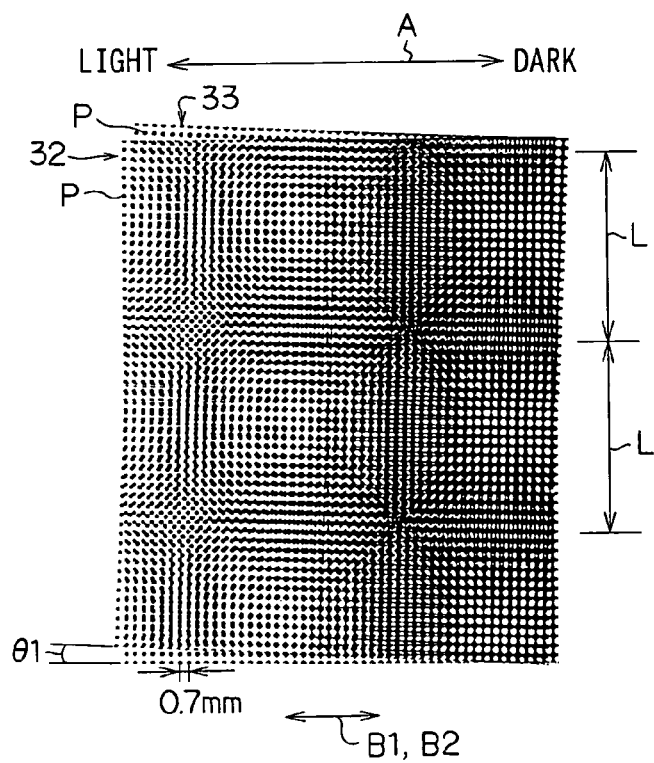
FIG. 12 is a front view of the display panel in which the first and the second layers are rotated relative to each other by an angle $\theta 1$.
Figure 13:
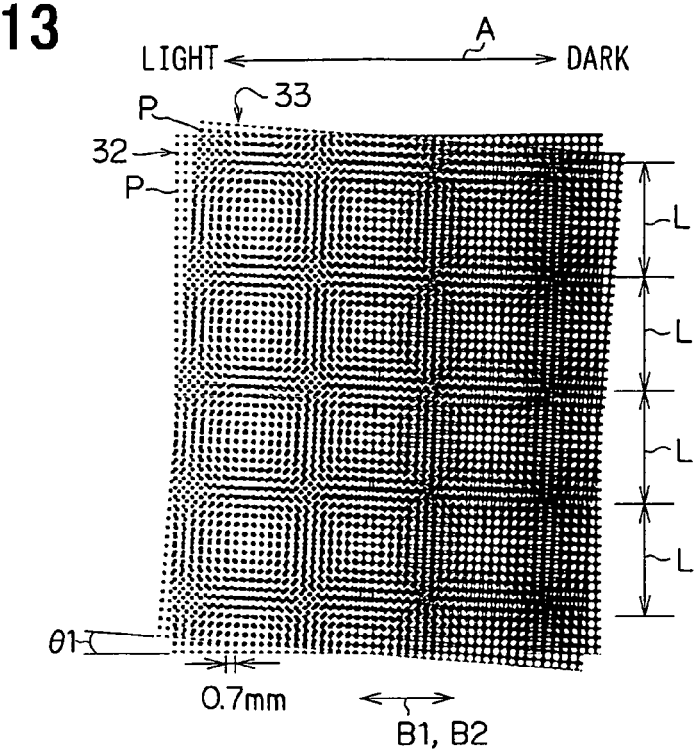
FIG. 13 is a front view of the display panel in which the first and the second layers are rotated relative to each other by an angle θ1.
Figure 14:
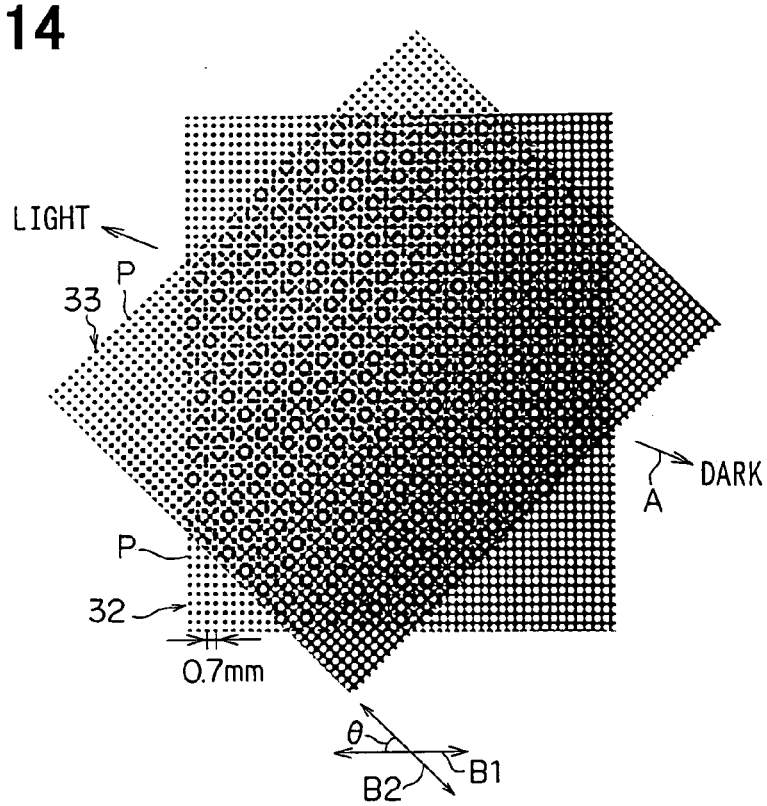
FIG. 14 is a front view of the display panel in which the first and the second layers are rotated relative to each other by an angle θ.

Fringes may be produced by interference as shown in FIGS. 12, 13. However, the fringes are less likely to be produced when the first and the second layers 32, 33 are rotated relative to each other by the angle θ. When the angle θ is not properly set, the fringes are recognized by the driver. The angle θ is preferably set between the 10 and 40 degrees inclusive.

The boundaries T1 lie at different positions between the center and the outer diameter. Thus, the brightness does not sharply vary around a boundary T in the background display 30c and the smooth gradations are produced.

The first and the second layers 32, 33 are printed opposite surfaces of the substrate. 31, namely, they are arranged apart from each other by a thickness of the substrate 31. As a result, a distance between the driver and the first layer 32 is different from a distance between the driver and the second layer 33. Because of this difference, the driver cannot easily focus on the first and the second layers 32, 33 at the same time. Therefore, the irregular patterns and the sharp variations in the brightness around the boundary T are less recognized by the driver even when they are produced.

The first and the second layers 32, 33 can be arranged a predetermined distance away from each other in the direction perpendicular to the surface of the substrate 31. The predetermined distance can be equal to the thickness of the substrate 31 or can be set as appropriate for reducing the fringes.

The substrate 31 contains light diffusing materials. Thus, light diffusion layers are formed in the first and the second layers 32, 33. The light diffusion layers diffuse and reflect light. The light emitted from the light source 60 is diffused when it passes through the substrate 31. As a result, the irregular patterns and the sharp variations in the brightness around the boundary T are less recognized by the driver even when they are produced.

Second Embodiment

Figure 6:
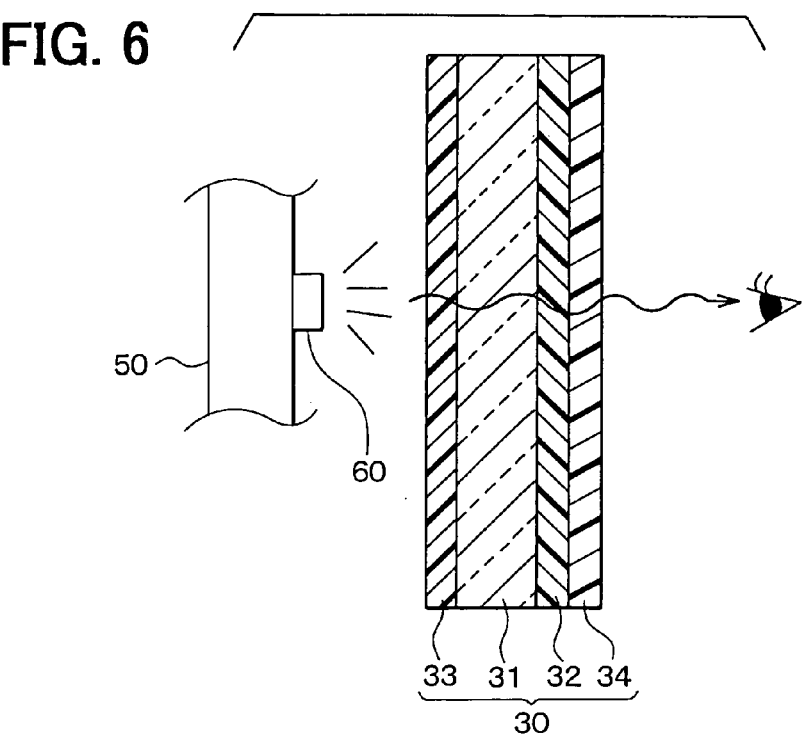
FIG. 6 is a cross-sectional side view of the display panel according to the second embodiment.

Referring to FIG. 6, a diffuse reflection layer 34 is formed on the display panel 30. The diffuse reflection layer 34 functions as a light diffusion layer. The diffuse reflection layer 34 is printed with ink containing light diffusing materials such as glass beads that diffuse and reflect light. As a result, the irregular patterns and the sharp variations in the brightness around the boundary T are less recognized by the driver even when they are produced. Mat ink may be used for reducing light that is reflected off the front surface of the display panel 30 and recognized by the driver.

Third Embodiment

Figure 7:
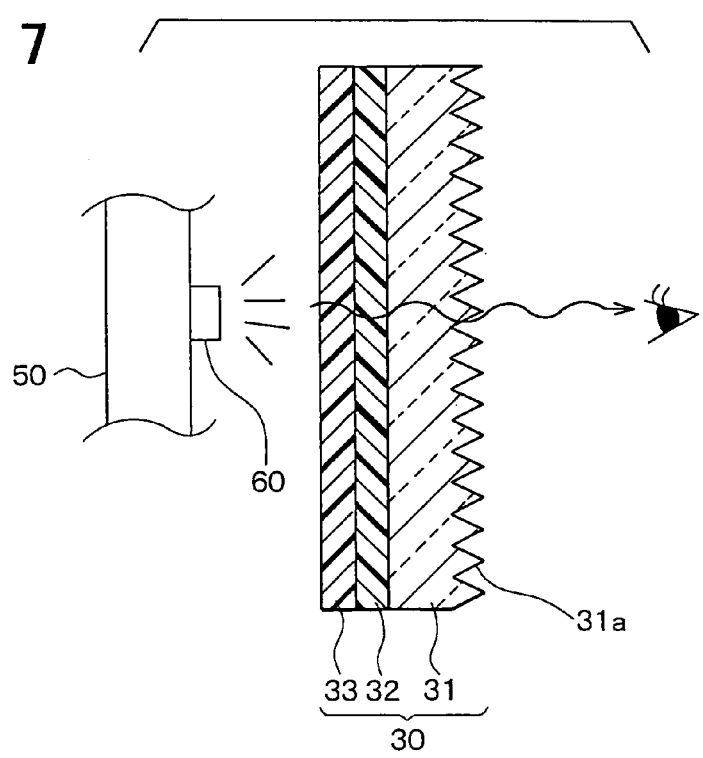
FIG. 7 is a cross-sectional side view of the display panel according to the third embodiment.

Referring to FIG. 7, at least one of the surfaces of the substrate 31 is unevenly finished to form a light diffusion layer 31a in the substrate itself. As a result, the irregular patterns and the sharp variations in the brightness around the boundary T are less recognized by the driver even when they are produced.

Fourth Embodiment

The first and the second layers 32, 33 are formed with halftone dots in different colors. When the first and the second layers 32, 33 are formed with halftone dots in black, the light transmittance is 0% at the dot coverage rate of 100%. When color of the dots is not black, the light transmittance does not become 0% at the dot coverage rate of 100% and light passes through the first and the second layers 32, 33.

One of the first and the second layers 32, 33 is formed with black halftone dots and the other is formed with white halftone dots. The dot coverage rate varies according to a position between the center and the outer diameter as line C3 shown in FIG. 8. Since the dot coverage rate of the first layer 32 and that of the second layer 33 equally vary, the dot coverage rate of the background display 30c linearly varies from 0% to 100% between the center and the outer diameter.

Figure 8:
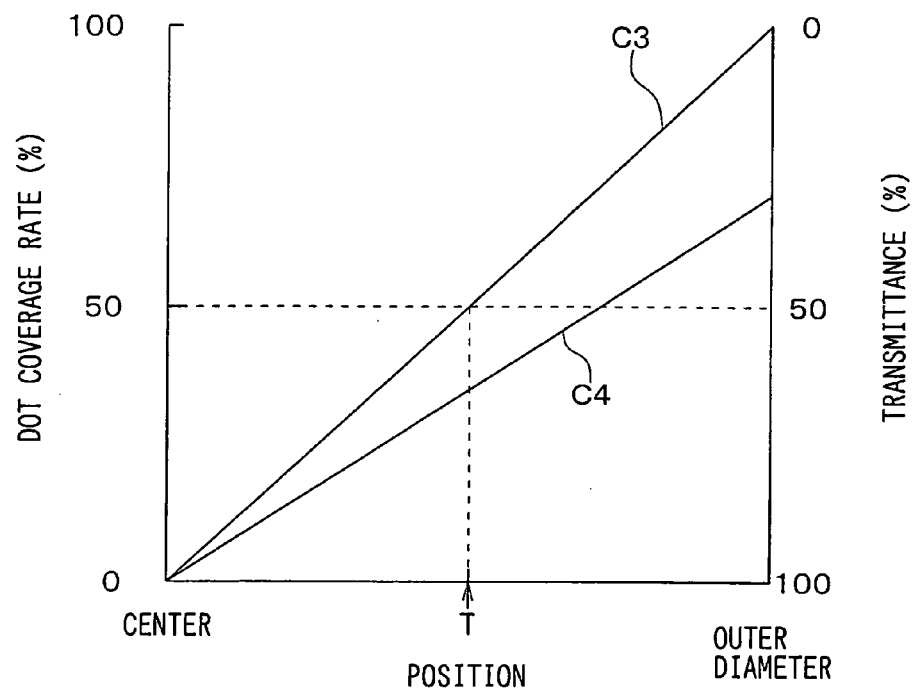
FIG. 8 is a graph showing relationships between the distance from the center of the display panel, the dot coverage rate, and the light transmittance according to the fourth embodiment.
Figure 10:
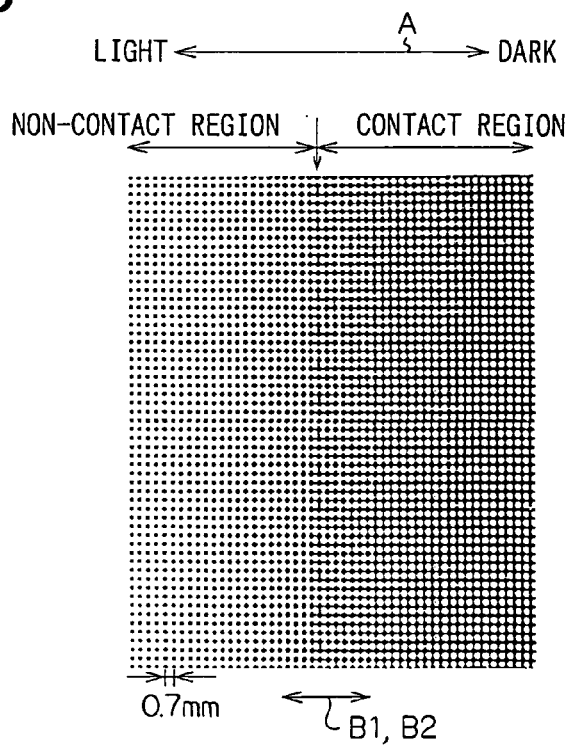
FIG. 10 is a front view of the display panel in which the first and the second layers are arranged in parallel to each other.

However, the light transmittance does not vary from 100% to 0% between the center and the outer diameter as indicated with line C4 in FIG. 8. This is because the light transmittance of the first layer 32 and that of the second layer 33 do not equally vary because of the color difference.

The irregular patterns that are clearly recognizable to the driver are further reduced by using different colors of halftone dots in combination. The boundaries T1 of the first and the second layers 32, 33 are located at the same point. However, the first and the second layers 32, 33 can be formed so that the boundaries T1 are located at different points as shown in FIG. 5. Moreover, the first and the second layers 32, 33 may be formed so that the dot coverage rate gently varies in the region having the light transmittance of around 0% or 100%, in comparison with the region having that of around 50%.

The present invention should not be limited to the embodiment previously discussed and shown in the figures, but may be implemented in various ways without departing from the spirit of the invention. For example, shapes of halftone dots included in the first layer 32 may be different from shapes of halftone dots included in the second layer 33. With this configuration, the irregular patterns that are clearly recognizable to the driver are further reduced.

The intervals of the halftone dots in the first layer 32 may be different from that of the halftone dots included in the second layer 33. With this configuration, the irregular patterns that are clearly recognizable to the driver are further reduced.

Figure 9A:
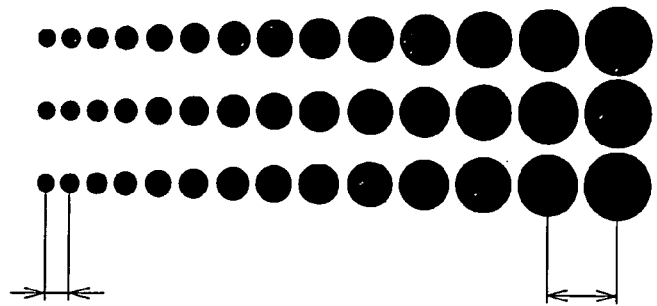
FIG. 9A is an example of gradation pattern according to a modification of the embodiments.
Figure 9B:
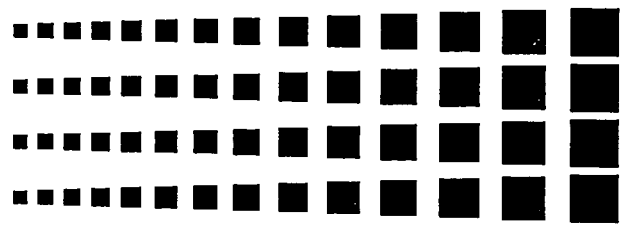
FIG. 9B is an example of gradation pattern according to a modification of the embodiments.
Figure 9C:
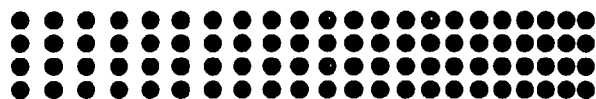
FIG. 9C is an example of gradation pattern according to a modification of the embodiments.
Figure 9D:
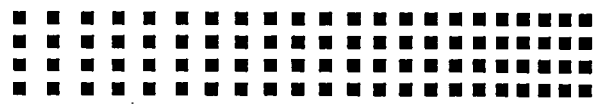
FIG. 9D is an example of gradation pattern according to a modification of the embodiments.
Figure 11:
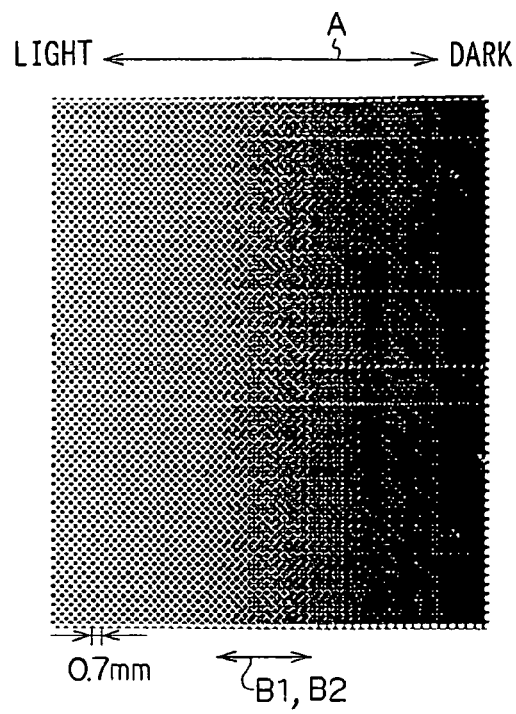
FIG. 11 is a front view of the display panel in which the first and the second layers are rotated relative to each other by a slight angle.

The first and second layers 32, 33 can be arranged on the front surface or the rear surface of the substrate 31. The display panel 30 may be directly lighted. In such a case, the diffusion layers 31, 31a, and 34 are required to be formed on the front surfaces of the printing layers 32, 33. The halftone dots may be arranged at irregular intervals. For example, round dots or square dots in different sizes may be arranged so that intervals increase as the sizes of the dots increase as shown in FIG. 9A or 9B. Round dots or square dots in the same size can be arranged at different intervals. In this case, the number of the dots in a unit area increases as the size of the interval decreases, namely, a density of the dots increases. These halftone dot arrangements can be applied to any of the above embodiments and the same effect can be produced.

What is claimed is:

1. A display panel for a display device, comprising:
   a substrate;
   a first halftone dot layer formed with halftone dots printed in a gradation pattern on the substrate so that brightness gradually changes; and
   a second halftone dot layer formed with halftone dots printed in a gradation pattern on the substrate so that brightness gradually changes, wherein
   the first halftone dot layer and the second halftone dot layer are arranged in parallel to each other yet rotated relative to each other by a predetermined angle measured between directions in which the halftone dots are aligned in the first and the second halftone dot layers.

2. The display panel according to claim 1, wherein:
   each of the first and the second halftone dot layers has a contact region in which adjacent halftone dots are connected with each other, a non-contact region in which adjacent halftone dots are apart from each other, and a tone jump boundary between the contact and the non-contact regions; and
   the first and the second halftone dot layers are arranged in a manner that the tone jump boundaries of the first and the second halftone dot layers lie at different positions.

3. The display panel according to claim 1, wherein the predetermined angle is between 10 degrees and 40 degrees inclusive.

4. The display panel according to claim 1, wherein the first and the second halftone dot layers are arranged at least a predetermined distance away from each other in a direction perpendicular to a surface of the substrate on which the halftone dots are printed.

5. The display panel according to claim 1, further includes a light diffusion layer arranged in parallel to the first and the second halftone dot layers for diffusing and reflecting light.

6. The display panel according to claim 5, wherein:
   the substrate is made of a translucent material;
   the substrate is formed with light diffusing materials for diffusing and reflecting light; and
   the light diffusion layer is formed in the substrate with the light diffusing materials.

7. The display panel according to claim 5, wherein the light diffusion layer is formed by printing a diffuse reflection layer with ink that contains light diffusing materials.

8. The display panel according to claim 5, wherein the light diffusion layer is formed by unevenly fishing at least one of the surfaces of the substrate.

9. The display panel according to claim 1, wherein the first and the second halftone dot layers are backlighted so that light passes through the first and the second halftone dot layers from back surfaces to front surfaces.

10. The display panel according to claim 1, wherein the display panel is used together with a light source in a display device for a vehicle.

11. The display panel according to claim 1, wherein the halftone dots included in the first halftone dot layer are different in color from the halftone dots includes in the second halftone dot layer.

* * * * *